United States Patent
Haussmann

(10) Patent No.: US 6,430,945 B1
(45) Date of Patent: Aug. 13, 2002

(54) PROCESS AND CONDENSER FOR THE CONDENSATION OF THE INTERIOR COOLANT FOR AUTOMOTIVE AIR-CONDITIONING

(75) Inventor: Roland Haussmann, Wiesloch (DE)

(73) Assignee: Valeo Klimatechnik GmbH & Co. (DE)

( * ) Notice: Subject to any disclaimer, the term of this patent is extended or adjusted under 35 U.S.C. 154(b) by 0 days.

(21) Appl. No.: 09/582,587

(22) PCT Filed: Oct. 26, 1999

(86) PCT No.: PCT/EP99/08075

§ 371 (c)(1),
(2), (4) Date: Oct. 16, 2000

(87) PCT Pub. No.: WO00/25071

PCT Pub. Date: May 4, 2000

(30) Foreign Application Priority Data

Oct. 27, 1998 (DE) .......................................... 198 49 528
Apr. 23, 1999 (DE) .......................................... 199 18 616

(51) Int. Cl.⁷ ............................. F28F 9/02; F25B 39/04
(52) U.S. Cl. ............................. 62/117; 62/509; 165/175
(58) Field of Search .................... 62/117, 509; 165/175

(56) References Cited

U.S. PATENT DOCUMENTS

| | | | | |
|---|---|---|---|---|
| 5,228,315 A | * | 7/1993 | Nagasaka et al. | 62/509 |
| 5,875,650 A | * | 3/1999 | Nobuta et al. | 62/509 |
| 6,250,103 B1 | * | 6/2001 | Watanabe et al. | 62/509 |

FOREIGN PATENT DOCUMENTS

| DE | 197 53 641 | 6/1998 |
|---|---|---|
| JP | 4244565 | 9/1992 |

OTHER PUBLICATIONS

Patent Abstracts of Japan vol. 1998, No. 05, Apr. 30, 1998 & JP 20 009999723 A (Denso Corp.), Jan. 16, 1998.
Patent Abstracts of Japan vol. 015, No. 325 (M–1148), Aug. 19, 1991 & JP–3 122472 A (Nippondenso Co. Ltd.) May 24, 1991.
International Search Report Feb. 16, 2000.

* cited by examiner

*Primary Examiner*—William Wayner
(74) *Attorney, Agent, or Firm*—Morgan & Finnegan, LLP

(57) ABSTRACT

The invention relates to a process and a plurality of embodiments of a fluidifier for condensing the interior coolant of an automotive air conditioning system into a saturated state, and for subsequent supercooling of said coolant, whereby the ambient air of the motor vehicle serves in said process as the external coolant. The path of flow of the interior coolant is divided into at least two parallel paths, which are subsequently united again. Upstream of said paths, the interior coolant is partially condensed from the gas phase into the liquid phase, and then condensed further along the first parallel path of flow into the saturated state, whereby the residual gas phase of the interior coolant is separated, whereas along the second parallel path, the interior coolant is supercooled and united again in the supercooled state with the saturated interior coolant of the first parallel path, the latter having been freed of the gas phase. Following the partial condensation, the interior coolant is supplied to the first and second parallel paths at a similar ratio of liquid to gaseous phase. Furthermore, along the second parallel path, the rate of flow of the coolant is reduced by a greater pressure loss in relation to the rate of flow of the coolant along the first parallel path.

28 Claims, 7 Drawing Sheets

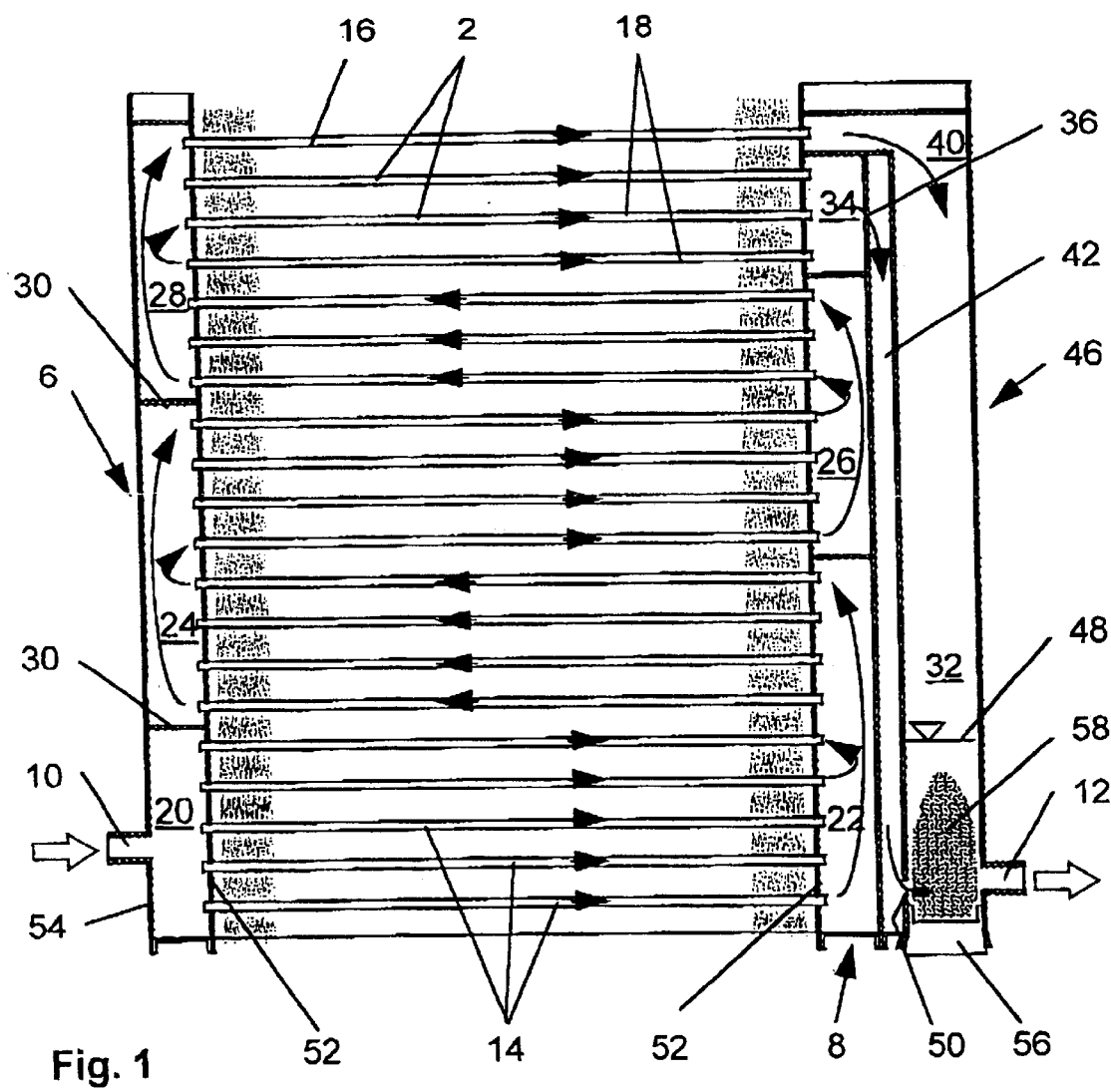
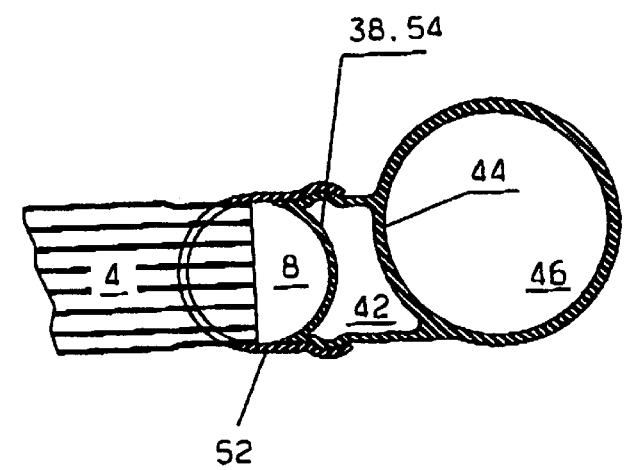
Fig. 1
Fig. 2

PROCESS AND CONDENSER FOR THE CONDENSATION OF THE INTERIOR COOLANT FOR AUTOMOTIVE AIR-CONDITIONING

BACKGROUND OF THE INVENTION

The invention relates to the condensation of a coolant of an automotive air conditioning system and in this connection concerns a process as defined in the introductory part of claim 1. Furthermore, it concerns a condenser as defined in the introductory part of claims 6 and 16. The condenser is intended in particular but not exclusively for carrying out the process. The features of the introductory parts of claims 1, 6 and 16 are known from the Patent Abstracts of Japan with publication number 03122472 A (date of publication: May. 24, 1991).

In connection with the known process and the known condenser, partial condensation takes place first on an upper vertical level of the condenser. A vertical distributing/collecting tube has in this connection at the same time the function of a gas separator. The path of flow of the interior coolant branches out into two parallel paths of flow. The first parallel path is fed in this connection from the upper zone of the gas separator that contains the separated gas phase, and feeds its coolant mixture consisting of saturated liquid and gas phase into a second gas separator, which is separately arranged on the outlet side. Said second gas separator communicates with a second path, in which the coolant is taken from the liquid charged in the first gas separator and supercooled. The supercooled liquid and the liquid taken from the second gas separator are subsequently united again and jointly withdrawn from the condenser. In connection with said known condenser, however, the level of the liquid in the first gas separator is variable depending on different and/or changing filling amounts of the interior coolant and/or changing operating conditions of the motor vehicle. Therefore, an unwanted admission of the liquid phase of the first gas separator, which is present only in the form of liquid, into the first parallel path can be only avoided with a very wide diameter of the first gas separator, which consequently is connected with very high filling amounts and high space requirements. This is contrary to the requirements with respect to minimization of the installation requirements in the motor vehicle, the ecologically desirable limited use of interior coolant that is harmful to the environment, as well as in regard to the generally desired lowest possible use of materials. On the outlet side, too, the known condenser comprises a great number of elements and line connections, which should be avoided to the greatest possible extent, and, furthermore, poses the additional risk of leakage.

The invention is based on the problem of achieving even with different and/or changing filling amounts of the interior coolant and/or changing operating conditions of the motor vehicle a safe condensation and supercooling function even with a small amount of interior coolant, while at the same time permitting the condenser to be designed in a compact form.

Said problem is solved by the process according to claim 1 and the condenser according to claim 6 or 16.

As opposed to the known condenser, according to the invention, the first and the second parallel paths of the first or second heat exchanger tube are practically fed with the same mixture of fluid and gaseous phase of the interior coolant as the latter exits in terms of flow from the last three heat exchange tubes. Any relative changes that might occur in the mixture are only minor in this connection and are caused, for example by differences in inertia, or due to the fact that the inlet into the first and second flow path takes place at different height. No provision is made for any device for dividing the liquid and the gaseous phases into the first and the second parallel path of flow. Instead, supercooling and thus also automatic resorption of any gas phase that might still be present is accomplished in that in the second path of flow, the interior coolant is exposed longer to the cooling effect of the external coolant than in the first path of flow. Claims 2 to 4 show various preferred possibilities in terms of process engineering for slowing down the rate of flow of the interior coolant along the second path of flow, which is required for such longer exposure, and claims 7 to 9 show various preferred possibilities for achieving this in terms of apparatus. It can be seen that provision is made alternatively for throttling down the flow of the coolant along the second path of flow and/or for a differential pressure level on the inlets of the first and the second paths of flow, whereby the different pressure levels at the inlet side can be produced by changing the rate of flow of the interior coolant based on the Bernoulli effect, thus through a nozzle characteristic. It is already known per se from the Japan Abstracts with publication number 10009713 A (date of publication: Jan. 16, 1998) to feed each path of two parallel paths—said paths being both intended for supercooling—separately, specifically by way of partial condensing, on the one hand, and only from the liquid phase of a gas separator that is interconnected following partial condensing, on the other hand. Therefore, in this case too, the one parallel path is supplied from admitted liquid phase.

Furthermore, it is not assured that the other parallel path will not carry along a gas phase from the condenser in spite of re-connecting with the first-mentioned parallel path. This construction, which has only become known very recently, therefore stems from the preconceived notion of prior art according to the introductory parts of claims 1, 6 and 16, which is that a path of supercooling has to fed with a liquid phase of a partially condensed coolant.

The procedure as defined by the invention and the invented condenser, like the aforementioned prior art, are based on the principle of dividing the path of flow after partial condensation of the interior coolant into two paths of flow, acting on the interior coolant in different ways.

In addition, a rather conventional process with associated condensers is available in which the interior coolant, following partial condensation, is directly passed on and put into a supercooled state without division into parallel paths of flow influencing the coolant in different ways, whereby, however, the supercooling zone is also in this case fed by liquid phase of the partial condensation carried out previously. In this connection, the usual procedure comprises connecting a gas separator upstream of the supercooling zone in the way as realized in the prior art with respect to the second path of flow (see in particular DE 42 38 853 A1 as well as Patent Abstracts of Japan J07180930 A2, published on Jul. 18, 1995, and J09166371 A2 published on Jun. 24, 1997).

According to the process according to claim 5 and a corresponding further development of the condenser according to claim 10, pre-condensation takes place in terms of location below the site for further influencing the interior coolant along the two aforementioned parallel paths of flow. Arranging pre-condensation tubes in the lower zone of a condenser is known per se (see, for example the aforementioned Patent Abstracts of Japan with file numbers J07166371A2 and J0387572 A2.

In furtherance of said idea of the present invention, said type of construction is used in order to obtain on the outlet side of the condenser the highest possible filling level range of a gas separator on the outlet side, and to be able to absorb there changes depending on different and/or changing filling amounts of the interior coolant and/or changing operating conditions of the motor vehicle without adversely affecting the function of the condenser. Due to the available great height it is possible in this connection to make do with a small diameter of said gas separator on the outlet side, which, as mentioned before, is not possible with the gas separator on the inlet side according to the publication Patent Abstracts of Japan with publication No. 03122472 A2. The small cross section of the gas separator provided on the outlet side according to the invention is particularly made possible on account of the fact that at the most half of the mass of the flow of the interior coolant, and preferably a smaller proportion is conducted via said gas separator.

Claims 11 to 13 relate to special constructional features of the last-mentioned type of design.

On the other hand, claim 14 with the further development according to claim 15 offers an alternative solution for the case in which pre-condensation, as with the object of the Patent Abstracts of Japan with publication No. 03122472 A2, on which the introductory parts of claims 1 and 6 are based, is carried out above the site of division of the path of flow of the interior coolant into two parallel paths of flow. As mentioned above, with said known condenser, provision is made for a separate gas separator located on the outlet side. The invention according to claims 14 and 15 integrates said gas separator in the center section of a distributing/collecting tube without the necessity of having to divide the distributing/collecting tube in the horizontal direction in a plurality of chambers. Dividing a distributing/collecting tube in several chambers disposed one on top of the other is known per se (see, for example, Patent Abstracts of Japan J09166371 A 2, where, however, none of the chambers is developed further into a gas separator.

Claim 16 relates to a further development and further enhancement of the invention described above. As far as technically possible, the full content of the features of said development and improvement is included also in the object of claim 16 and the further developments of the latter.

The further development and further enhancement of the invention according to claim 16 are also made use of in particular by the process claim 1 and preferably by the process claim 2 as well.

An additional, i.e. a fourth exemplified embodiment of the object of the invention is described in special detail, stating in particular an alternative to the basic structure of the first and second exemplified embodiments. The introductory part of claim 16 is based in this connection on claim 6 and particularly includes also the special arrangement and design of the collecting container realized in the first and second exemplified embodiments.

Also the claims 7 to 9 as well as 11 to 13 are included in this connection as claims 17 to 22, whereby the present fourth exemplified embodiment concretely contributes to the realization of claim 7, to which the claims 8 and 9 represent possible alternatives also within the framework of the present fourth exemplified embodiment.

Claim 23 with its further developments in the claims 24 to 27 specifically relates to the object of claim 13, which is included also in claim 22, and may also be protected independently in the present fourth exemplified embodiment as this is the case also especially in the first and second exemplified embodiments.

The coolant inlet 10 is arranged in the condenser at the bottom both in the first and second exemplified embodiments. The coolant then flows through the chambers 22, 24, 26 and 28 in the upward direction against the direction of gravity.

Especially in connection with lower rates of flow of the coolant, it may occur that liquid coolant and lubricating oil carried along by the coolant from the coolant circulation each may get separated in the lower chamber zones, which may more or less clog the lowermost "third" heat exchanger tube 14 entering in each case in the respective chamber, so that inner heat exchanging surface area is lost and the efficiency of the condenser is reduced. Furthermore, especially the oil that is separated in the lower zone of the chamber 24 is missing for lubricating the compressor of the coolant circuit.

The invention of the fourth exemplified embodiment is therefore based on the specific problem of enhancing the removal of oil from the condenser and preventing any blocking of individual "third" heat exchanger tubes designed in the form of flat tubes entering the lower chamber zone, thereby improving the efficiency of the condenser.

Said problem is solved in connection with a condenser with the features of the introductory part of claim 16 by the characterizing features of said claim.

With this condenser, the coolant enters the condenser at the top, and the superheating and condensation zone is connected from the top downwards in such a way that liquid coolant or oil no longer can get deposited in the lower chamber zones because a discharge takes place in each case from the lowermost tube into the next opposite chamber.

As compared to the first and second exemplified embodiments, furthermore, the intermediate channel 42 is utilized in a different way as well due to the changed vertical level at which the coolant enters into the distributing and collecting tube 6, namely for transporting saturated liquid upwards with gas bubbles against the direction of gravity into the upper zone of the collecting container 46, the function of which being otherwise basically the same as in the first and second exemplified embodiments of the main patent.

In contrast to the third exemplified embodiment, therefore, the functions of the present fourth exemplified embodiment according to claim 16 are comparable with the first and second exemplified embodiments.

The dryer insert is developed further in claims 3 to 27 especially with respect to the present fourth exemplified embodiment; however, it can be employed also in the first and second exemplified embodiments from which the present invention of further development ensues.

The invention is explained in greater detail in the following with the help of schematic drawings relating to a number of exemplified embodiments. In the drawings, FIG. 1 shows a vertical cross section through a first exemplified embodiment of a condenser.

FIG. 2 shows by an enlarged representation a horizontal part section through the distributing/collecting tube shown in FIG. 1 on the right-hand side with the integrated collecting container.

FIG. 9 shows a thermodynamic phase diagram relating to the present fourth exemplified embodiment and based on the phase diagram according to FIG. 5a.

Figure 3:
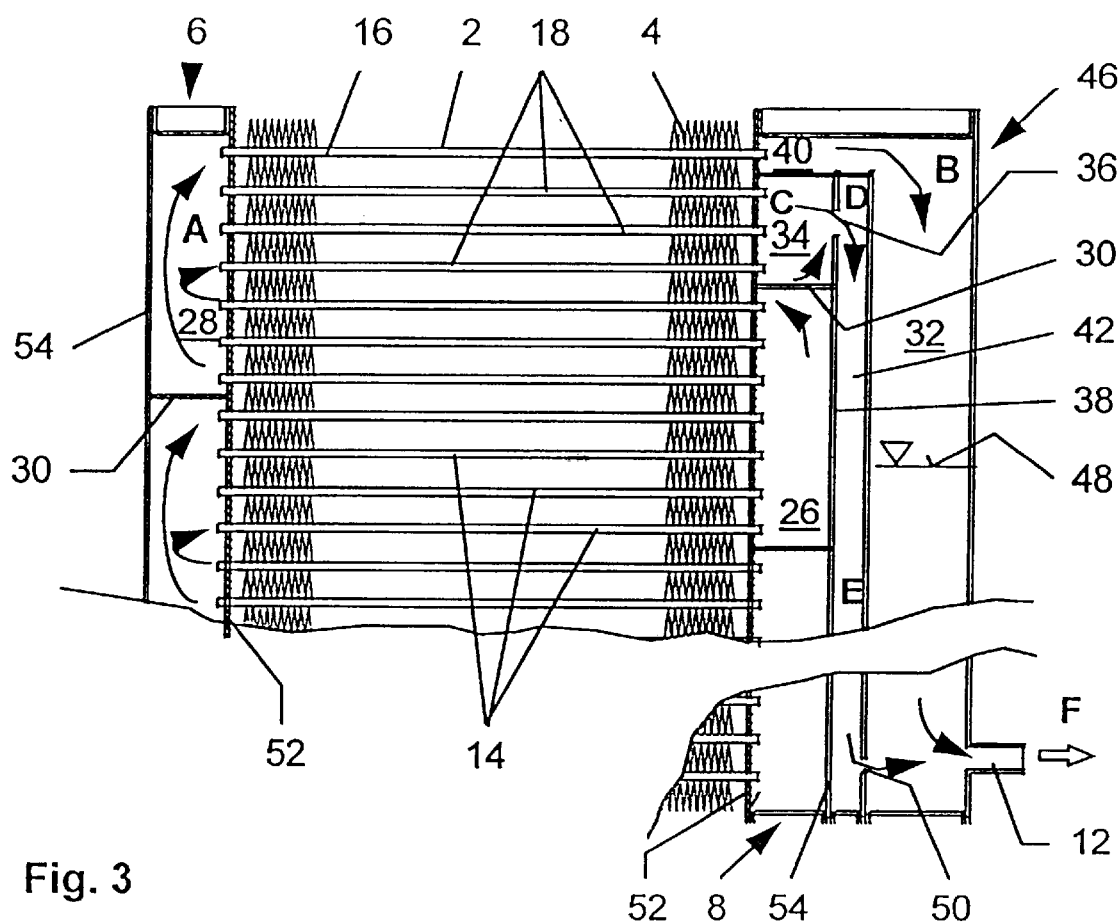
FIG. 3 is an enlarged part representation of FIG. 1.

All four exemplified embodiments have the following in common:

Provision is made for a network of horizontally oriented heat exchanger tubes 2, which are arranged parallel with one another one on top of the other.

Said heat exchanger tubes may have any desired conventional shape and may be made of any desired type of material. Preferred are flat tubes made of aluminum or an aluminum alloy, which are joined to form a rigid register by the zigzag lamellas 4 which are soldered in between with hard solder. Since the condenser is intended for the air conditioning system of a motor vehicle, said register is acted upon from the outside by ambient air of the motor vehicle, namely vertically in relation to the plane of the drawing, for example of FIGS. 1 as well as FIGS. 3 to 5, said ambient air serving in the present case as the external coolant. Any suitable coolant may serve as the interior coolant of the heat exchanger tubes 2, for example such as R134a, or $CO_2$ according to the future conception.

The heat exchanger tubes 2 are supplied with the interior coolant on the inlet and outlet sides via two vertically extending distributing/collecting tubes 6 and 8, which are connected with the individual heat exchanger tubes 2 in the four exemplified embodiments in different ways.

Figure 4:
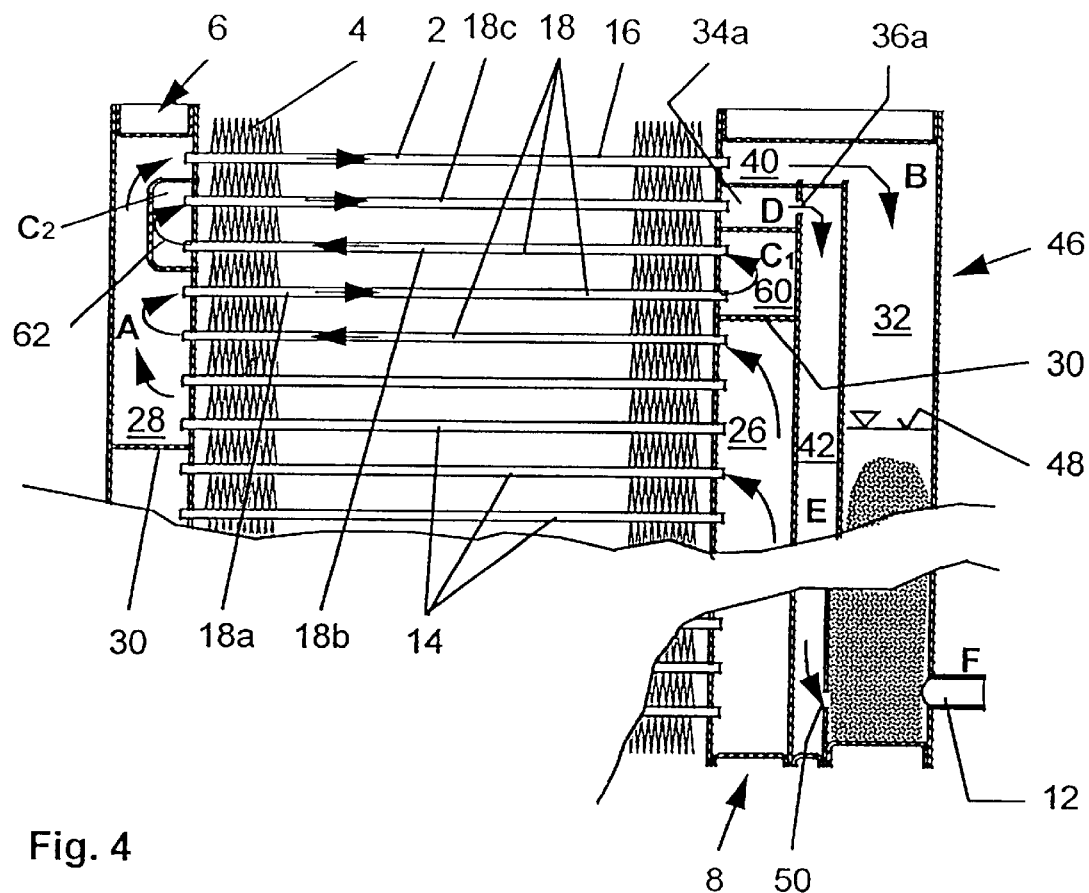
FIG. 4 shows a vertical part cross section of a second exemplified embodiment of a condenser.

The interior coolant enters the one distributing/collecting tube via an inlet connection 10 and exits via an outlet connection 12, which may be arranged in a way not shown on the interconnection, or on the other distributing/collecting tube as shown in the representations, for example of FIGS. 1, 3 and 4, or on a structural component that is structurally joined with Finally, all condenser have in common that a distinction has to be made in connection with said condenser between three types of heat exchanger tubes depending on the type of their cooling function, whereby three different paths of flow of the interior coolant correspond with such three types of tubes, each being interconnected via the distributing/collecting tubes.

For example, the interior coolant coming from the inlet connection 10, being at least substantially gaseous or mostly even in the superheated state, is supplied to at least one "third" heat exchanger tube. Along the associated third path of flow, the interior coolant is partly condensed first in the zone of influence of the external cooling air from the gas phase to the liquid phase, so that it is still present in the form of a mixture of liquid and gaseous phases when it exits from said third path of flow. This is shown in the phase diagrams shown in FIGS. 3a, 4a and 5a by the state "A", which is indicated in said diagrams together with the other states. In said diagrams, the pressure "p" of the interior coolant is logarithmically plotted over the enthalpy "h". Said diagram jointly shows the left limit curve of the two-state area of the phases for saturated liquid, so that in the phase diagram-shown drawn out, all conditions disposed in the plane of the drawing on the right still contain gas phase, whereas all conditions disposed on the left correspond with the pure liquid state.

The continuation of the path of flow of the interior coolant at the outlet of said third path of flow is divided in two parallel paths of flow, namely the first parallel path and the second parallel path conforming to at least one "first" heat exchanger tube 16 and at least one "second" heat exchanger tube 18.

Along the first parallel path of flow conforming in each case to the respective heat exchanger tube 16, the mixture consisting of liquid and gaseous phase of the interior coolant and coming from the third path of flow, with further cooling by the external coolant in the form of ambient air, is condensed further without intermediate treatment to the saturated state, whereby a small residual amount of gas phase may still remain left over. Said residual gas phase is then separated by the interior coolant.

Along the second parallel path conforming in each case to the second heat exchanger tube 18, the mixture of liquid and gas phase of the third path of flow is directly withdrawn without intermediate treatment in accordance with the respective third heat exchanger tube 14, but then exposed to the cooling influence of the external coolant in the form of the ambient air for a longer period of time than along the first path of flow, and supercooled in this way. In said supercooled state, absorbed gas phase is resorbed without the requirement of having to be separated separately, so that at the outlet of the second flow path the interior coolant no longer contains any gas phase. However, if, under special circumstances, inclusions of gas phase should nonetheless still be present along said second path of flow, such inclusions will be condensed again in the interior coolant by the vibrations caused by the operation of the vehicle without requiring any further measures.

The liquid phase of the interior coolant exiting purified by the separation of the gas from the first path of flow is then united with the supercooled interior coolant exiting from the second path of flow, and jointly supplied in the liquid phase to the outlet connection 12.

In all exemplified embodiments, the third heat exchanger tube 14 is supplied in each case with the interior coolant in terms of construction in the manner known per se from the distributing/collecting tube 6 as well, the latter being provided with the inlet connection 10. A multitude of third heat exchanger tubes, typically 6 to 8 with flat aluminum tubes, are fed in parallel from an inlet chamber 20 located in the distributing/collecting tube 6. The outlet ends of said heat exchanger tubes feed into a collecting and distributing chamber 22 in the distributing/collecting tube 8, from where a smaller multitude of third heat exchanger tubes 14 are returned for reflux to the distributing/collecting tube 6.

In the exemplified embodiments 1 to 3, provision is made for another collecting and distributing chamber 24 in the collecting/distributing tube 6, from which chamber 24 another smaller number of third heat exchanger tubes are again returned via a distributing and collecting chamber 26 in the distributing and collecting tube 8 to a last distributing and collecting chamber 28 located in the distributing/ collecting tube 6. If flat aluminum tubes are employed, the number of heat exchanger tubes 14 acted upon in parallel is typically reduced in the last-mentioned return line to 2 to 4, whereby only three heat exchanger tubes 14 are shown in each of the exemplified embodiments.

The distributing and collecting chambers, in particular the chambers 22 to 28 each are completely divided from each other in terms of flow in the distributing/collecting tube 6 by a simple transverse wall 30.

Furthermore, in all exemplified embodiments, the coolant coming from the first path of flow enters in each case a gas separator 32 which, however, is realized in a different way in each of the individual exemplified embodiments.

The special features of the exemplified embodiments 1 to 3 are based on the following:

In the first exemplified embodiment shown in FIGS. 1 to 3a, the first path of flow is limited to one single first heat exchanger tube 16 without limiting the generality of these configurations. The interior coolant shown exactly on the dashed saturation line exits in most cases from said tube 16 with still a small residual amount of gas phase in accordance with the phase diagram "5B" in FIG. 3a, and enters the gas separator 32. This is explained in greater detail later in the following.

The interior coolant having the aforementioned state A in the phase diagram and coming from the last three third heat exchanger tubes 14 is supplied in this connection not only to the inlet of the first heat exchanger tube. 16, but without further modification and in particular also without any interconnected separation of gas to the second heat exchanger tubes 18, which are jointly acted upon parallel with one another and present in a triple quantity without limiting the generality of this configuration. Said tubes 18 all feed into a collecting chamber 34 located in the distributing/collecting tube 8 which, in the direction of flow, is provided downstream with a throttling device 36 that is common to only three second heat exchanger tubes 18, said throttling device being designed in this case in the form of a throttling passage located in the outer wall 38 of the distributing/collecting tube. Because of the throttling effect of said throttling means 36, the interior coolant passes through the second heat exchanger tubes 18 at a substantially lower rate of flow than through the first heat exchanger tube 16, and supercooling is realized in this way in said second path of heat exchange in the collecting chamber 34 in accordance with the phase point "C" of the phase diagram shown in FIG. 3a. By means of the throttling passage, the interior coolant is reduced to a lower pressure downstream of the throttling passage with no change in the enthalpy, which corresponds with the phase point "D" in the phase diagram shown in FIG. 3a.

Before the changes in the phases are discussed further, the concrete structural design of said first exemplified embodiment is explained further as follows:

It is shown with particular clarity by the horizontal cross section in FIG. 2 that provision is made for the additional formation of a chamber that is located parallel with the distributing/collecting tube 8 on the outer wall 38 of said tube facing the register of tubes, such additional chamber being structurally integrated. Below a collecting chamber 40, into which the first heat exchanger tube 16 is feeding, a tubular chamber 42 extends vertically along the distributing/collecting tube 8. Said tubular chamber 42 is separated from the collecting chamber 40 and has its own outer wall 44 on the side opposite the outer wall 38 of the distributing/collecting tube 8, said outer wall 44 being common to a tubular collecting container 46 having a larger horizontal cross section. Said collecting container, which may but need not have a circular shape in accordance with FIG. 2, freely communicates at the top with the collecting chamber 40 of the first heat exchanger tube 16. The tubular chamber 42 in turn communicates with the outlet of the throttling means 36, which is located downstream of the second flow path in terms of flow. The collecting container 46 itself has the function of a gas separator as addressed herein above, so that a horizontal phase interface 48 is present in said container between the liquid phase located at the bottom and the gas phase located at the top, said phase interface being present at different levels depending on the operating conditions and the filling level of the interior coolant. The interior space of the tubular chamber 42, which is generally completely filled with supercooled interior coolant, communicates at the bottom with a lower zone of the gas separator 32, said zone being always filled with the liquid phase by way of a connecting opening 50. In said lower zone of the gas separator 32, the interior coolants of the first and second paths of flow are united with each other and passed on in the direction of flow from the outlet connection 12.

It is useful in terms of construction if at least the tube bottom 52 of both the distributing/collecting tube 8 and the distributing/collecting tube 6 receiving the various heat exchanger tubes 2 is shaped from solder-coated sheet metal and supplemented by a collector cover 54 for the collector. Especially in the case of the distributing/collecting tube 8, said collector cover 54 is a component of an extrusion-molded piece which, in the form of one single part, forms both the tubular chamber 42 and the tubular collecting container 46, and usefully consists of aluminum or an aluminum alloy. The connection with the collector bottom is usefully realized in the form of an inside coating of solder applied to the sheet metal of the bottom of the collector, said sheet metal being coated on both sides.

Within the region of the lower zone of the collecting container 46, normally occupied by the liquid phase, a dry cartridge 58 is inserted in a sealable inlet opening 56 located at the bottom of the collecting container 46. In a manner not shown it is also possible to install in the collecting container 46 devices for controlling the filling level and for measuring the pressure and temperature, using, for example sensors with suitable display of the diagnosis.

Downstream of the throttling means 36, the tubular chamber 42 is practically completely filled with supercooled coolant when the condenser is operating, so that the static pressure of the entire column of liquid is prevailing at the bottom end of the tubular chamber, said liquid column extending over almost the entire height of the condenser (with exception of the height of the collecting chamber 40). On the other hand, in the tubular collecting container 46, the height of the column of liquid below the phase interface 48 is always smaller and, furthermore, varies depending on the amount of filling as well as on the operating conditions of the motor vehicle.

Therefore, since a gas phase can still be collected in minor amounts in the tubular chamber 42 always at the top end above the throttling means 36, a difference in height exists between the level of liquid disposed at the top end of the tubular chamber 42 and the phase interface 48 in the collecting container 46. Said difference in height corresponds with the pressure difference between the phase points "C" and "D" in the phase diagram shown in FIG. 3a. In said diagram, then, the phase point "E" corresponds with the renewed increase in pressure within the tubular chamber 42 in accordance with the increase in pressure caused by the column of liquid between the liquid level disposed uppermost in the tubular chamber 42, and the phase interface 48 in the collecting chamber 46. When the currents of coolant of the first and second paths are then united, a minor increase in pressure still occurs in both paths in accordance with the phase point "F" in the phase diagram of FIG. 3a, on the one hand, and between the phase interface 48 and the connection 12 because of the column of liquid, on the other hand.

It is deemed desirable in this connection within the meaning of the invention that only a relatively small proportion of flow of mass of the coolant takes place along the first path of flow in relation to the flow of mass occurring along the second path of flow, i.e. 50% of the flow of mass at the most, preferably less. The gas separator 32 can be dimensioned small in this way without loss of quality of its gas separation function; in the present case it can be dimensioned then with a relatively small horizontal cross section, with the consequence that in the phase diagram of FIG. 3a, the value of the enthalpy "h" will be located in the center between the points "E" and "B" at the most, and with the desired very small proportion of mass flow along the first path it is shifted very clearly in the direction towards point "E".

Figure 3A:
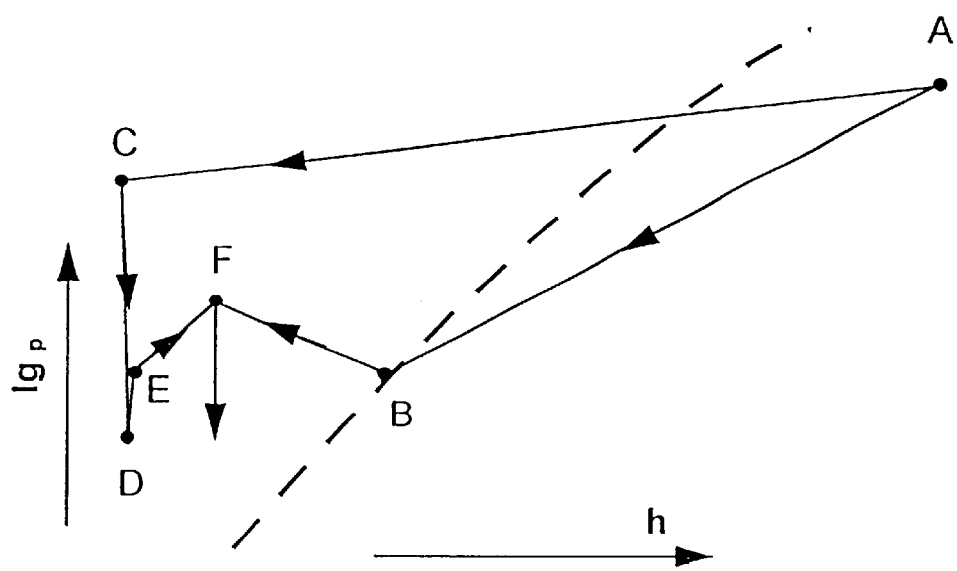
FIG. 3a is a thermodynamic phase diagram related to FIG. 3.
Figure 4A:
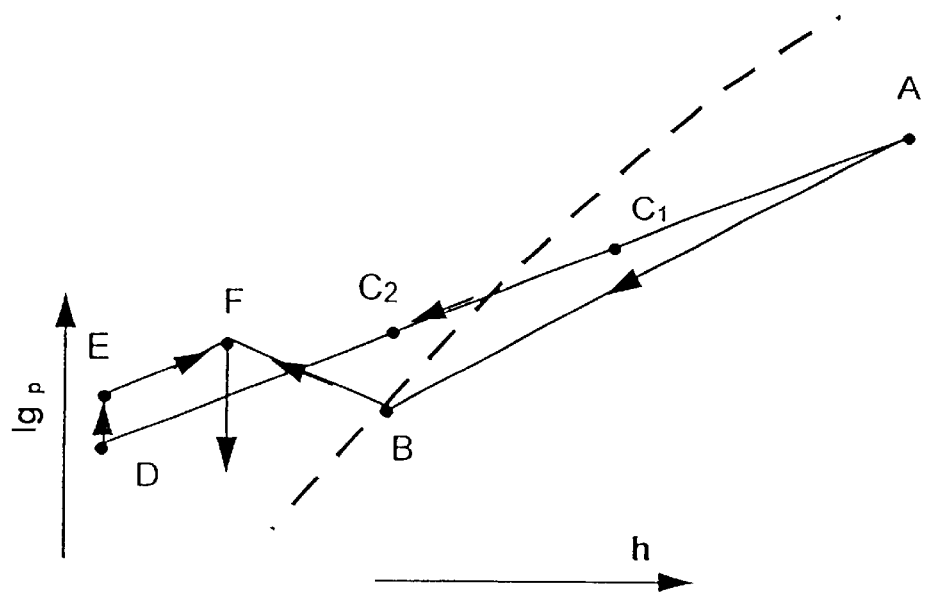
FIG. 4a shows a thermodynamic phase diagram related to FIG. 4.

The second exemplified embodiment according to FIG. 4a is identical with the one according to FIGS. 1 to 3a with the following exception:

Instead of using the throttling means 36, which can be entirely omitted or which may still be present in proportionate combination, if need be, throttling of the flow of mass from the second path of flow is realized in that the length of the second path of flow is distinctly increased in relation to the length of the first path of flow, in the present case by a factor of three. Throttling is accomplished in this connection by means of inner friction in the heat exchanger tubes 18.

The collecting chamber 34 shrinks here in relation to the arrangement of FIG. 3 to a small collecting chamber 34a, which is located in term of flow downstream of the last heat exchanger tube 18c of the second flow path. The two heat exchanger tubes 18a and 18b are located upstream of said heat exchanger tube 18c in the back and forth flow. Only the heat exchanger tube 18a located lowermost is still directly fed from the dividing and collecting chamber 28. In a reversing chamber 60, which represents an additional chamber in comparison to FIG. 3, the heat exchanger tube 18b is fed countercurrent, and in a further reversing chamber 62, which is boxed in the volume of the distributing and collecting chamber 28, the feed of said heat exchanger tube 18c will then take place. The connecting opening 36a of the collecting chamber 34a no longer requires any throttling function in the present case even though such a function can be partially preserved as mentioned above.

The phase diagram of FIG. 4a is modified in this connection especially as compared to the phase diagram of FIG. 3a in that a pressure drop according to the phase points "C1", "C2" and "D" takes place each time as the coolant passes three times through the heat exchanger tubes 18a, 18b and 18c.

Two further modifications are explained in the following with the help of FIG. 5. Said modifications each can be employed also individually in the same sense for altering the described first and second exemplified embodiments.

Figure 5:
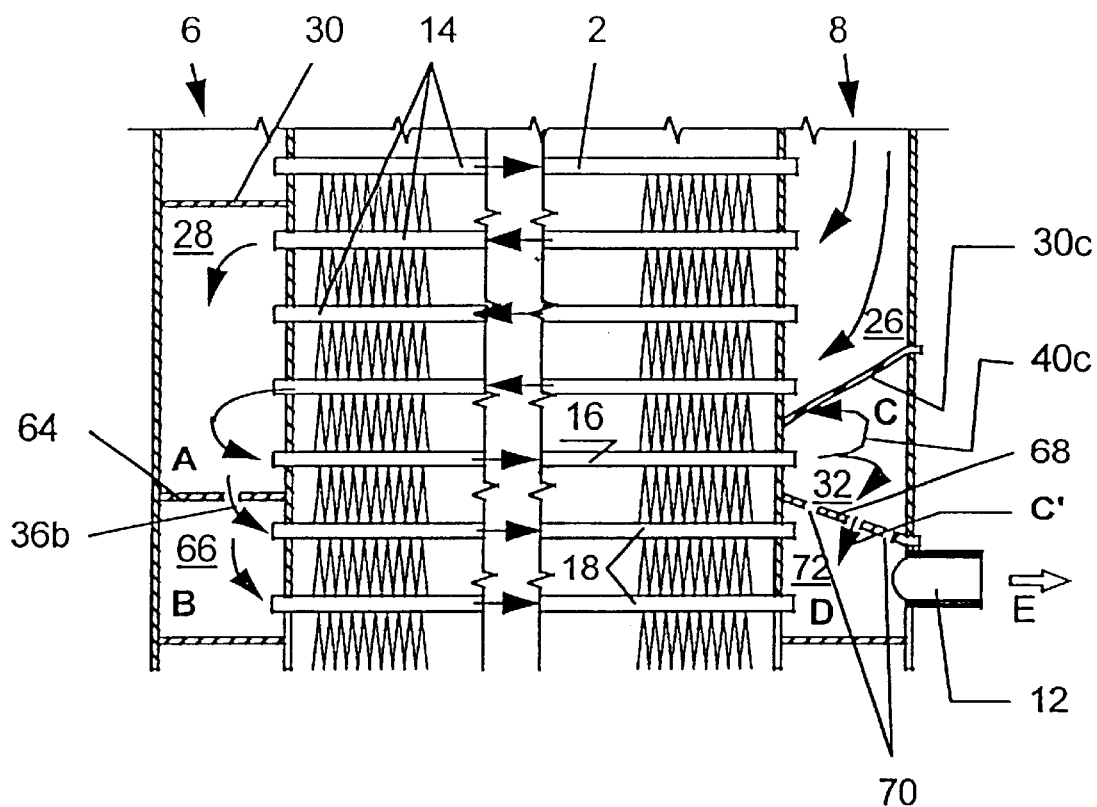
FIG. 5 shows a vertical part section through a third exemplified embodiment of a condenser.

While according to the first exemplified embodiment, the flow of mass is throttled in the second flow path at the end of the latter via the throttling means 36, and in the second exemplified embodiment by inner friction that has been increased in relation to the first flow path over the entire distance of the second flow path, the flow of mass is throttled in connection with the design of the distributing and collecting tube 6 shown on the left in FIG. 5 before the coolant coming from the third flow path enters the second flow path and passes through a throttling means 36b in a transverse wall 64 between a feed chamber 66 leading to the second flow path, and the general (last) distributing and collecting chamber 28. Furthermore, such a measure for reducing the rate of the flow of mass in the second flow path can be combined, if need be, with the possibility for throttling the flow along the second flow path as described in the foregoing, or in the direction of flow downstream of the latter path.

The second variation lies in the type of gas separator 32 employed downstream of the first flow path or the first heat exchanger tube 16.

An important special feature of the first and second exemplified embodiments is that the third path of flow in said exemplified embodiments is arranged in each case in an area below the second and the first flow path located above the latter. On the other hand, in the third exemplified embodiment according to FIG. 5, the third flow path of the heat exchanger tubes 14 is arranged above the first flow path of the one heat exchanger tube 16 and the underlying second flow path with the two heat exchanger tubes 18. Additional possibilities for separating the gas are made available in this way without having to connect the tubular chamber 42 and the tubular collecting container 46 to the distributing and collecting tube 8. It is rather possible to design said distributing and collecting tube 8 like the distributing and collecting tube 6 without any additional crosswise division in the horizontal direction, or any horizontal joining of chambers as in the first and second exemplified embodiments. It is noted here that instead of the first and second exemplified embodiments with linked-up chambers it is possible also to make provision for a horizontal subdivision of the distributing and collecting tube 8 in about the way in which it is done with the reversing chamber 62 in FIG. 4 in the distributing and collecting tube 6 of the second exemplified embodiment.

In the third exemplified embodiment according to FIG. 5, the first heat exchanger tube 16 in the distributing and collecting tube 8 feeds into a collecting chamber 40c, which in the present case at the same time has the function of a gas separator 32. For this purpose, the collecting chamber 40c is completely separated in terms of flow from the collecting and distributing chamber 26 adjoining it at the top by a partition or wall 30c located at its top side. Furthermore, on the bottom side of the collecting chamber 40c, provision is made for another partition 68 which, however, is perforated by a plurality of openings 70.

The two partitions 30c and 68 each extend vertically and curved outwards in such a way that the collecting chamber 40c is provided with a volume that is enlarged both vertically upwards and vertically downwards. The additional volume gained in this way below the region of the partition 30c bulged upwards may serve as a preliminary separation space for separating gas phase of the gas separation space 32, whereas the partition 68 increases not only the volume for receiving the liquid phase of the gas separator 32, but additionally also makes available passage openings for the coolant exiting on the first parallel path in order to be united with the supercooled coolant exiting on the second parallel path via the heat exchanger tubes 18 for the mixture of the coolant exiting from both the first and the second parallel paths. The collecting chamber 72 located at the outlet of the heat exchanger tubes 18 of the second parallel path is accordingly at the same time also a chamber for unification with the phase exiting from the gas separator 32, and also a common outlet chamber that communicates with the outlet connection 12.

Figure 5A:
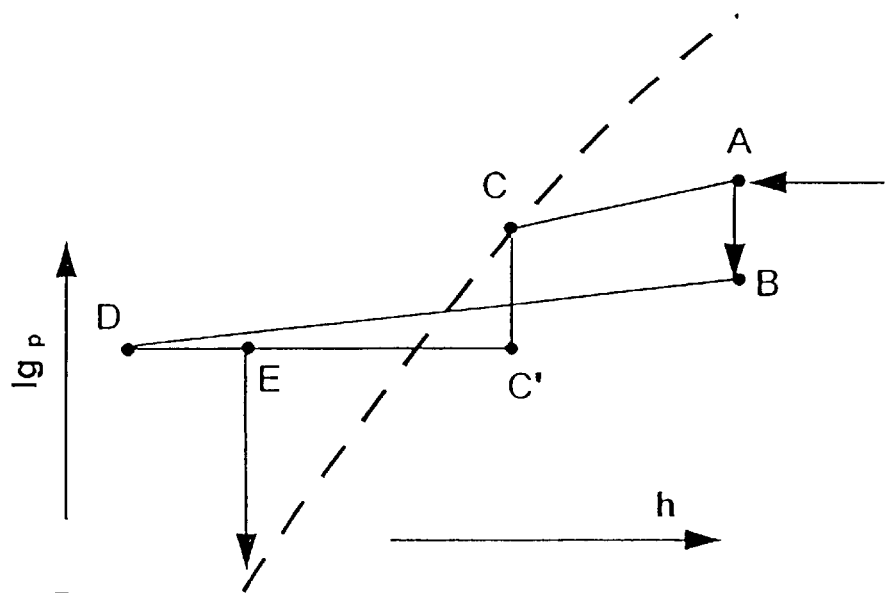
FIG. 5a is a thermodynamic phase diagram related to FIG. 5.

It is assumed in connection with the phase diagram according to FIG. 5*a*, as it is in connection with the exemplified embodiments 1 and 2, that a state "a" of partial condensation exists that is still in the range of partial condensation located to the right of the dashed phase separation line shown in FIG. 5*a*. In the first heat exchanger tubes 16 the coolant is then admitted to a saturated state "C" on the phase separation line. The pressure drop that occurred through the openings 70 in the partition 68 is represented by the pressure reduction from phase point "C" to "C'".

In the second path of flow, the pressure of the coolant is first reduced from the saturated state "A" to the state "B" through the throttling opening 36*b*, and the coolant is subsequently changed to the supercooled state "D" in the second heat exchanger tubes 18.

In the outlet collection chamber 72, the supercooled phase "D" and the saturated phase "C'" are then mixed according to the mass flows into the phase "E" that exits from the condenser via the outlet connection 12.

In the fourth exemplified embodiment according to FIGS. 6 to 9, provision is made for a network of horizontally oriented heat exchanger tubes 2, which are arranged parallel with one another and one of top of the other. Said tubes may have any desired conventional shape and they can be made of any desired material. Flat tubes made of aluminum or aluminum alloy are preferably employed, such tubes being joined with each other by the zigzag lamellas 4 to form a rigid register, whereby the lamellas are soldered in between the tubes with hard solder. As the condenser is intended for an automotive air conditioning system, ambient air of the motor vehicle is admitted into said register from the outside perpendicular to the plane of the drawing in FIG. 6, said ambient air serving here as the external coolant. Any suitable coolant such as, for example R134*a*, or CO2 according to the future conception, may serve as the interior coolant.

Figure 6:
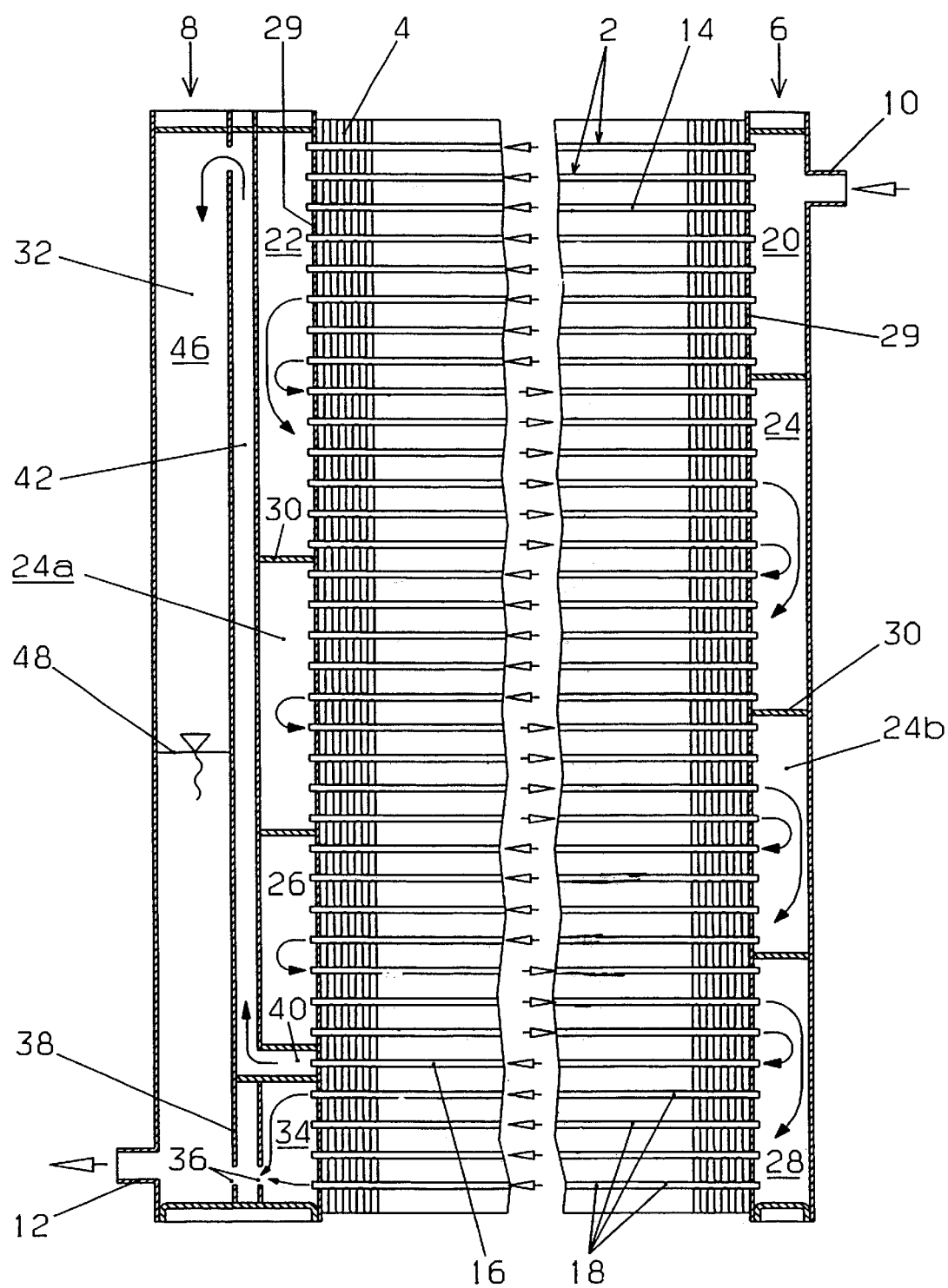
FIG. 6 shows a vertical cross section through the fourth exemplified embodiment of a condenser, said section being based on FIGS. 1 and 4.

The heat exchanger tubes 2 are supplied with the interior coolant on the inlet and outlet sides according to the arrows shown in FIG. 6 via the two vertically extending distributing and collecting tubes 6 and 8.

The interior coolant enters an inlet chamber 20 in the upper zone of the distributing and collecting tube 6 via an inlet connection 10 and exits via an outlet connection 12 arranged in the lower zone of the collecting container 46.

The interior coolant coming from the inlet connection 10, said coolant being at least substantially gaseous and in most cases even in the superheated state, is supplied from the inlet chamber 20 to at least one "third" heat exchanger tube 14. In the associated third flow path, the interior coolant is first partially condensed in the zone of influence of the external cooling air from the gas phase to the liquid phase, so that when it exits from said third flow path it still contains a mixture of liquid phase and gaseous phase. This is shown in the phase diagram according to FIG. 9 by the state or phase "A" that is indicated in the diagram together with the other phases or states. In said diagram, the pressure "p" of the interior coolant is logarithmically plotted over the enthalpy "h". Said diagram also jointly shows the left limit curve of the two-phase area of the phases for saturated liquid, so that all phases disposed on the right in the phase diagram represented drawn out still contain a gas phase, whereas all conditions shown on the left correspond with a liquid state.

At the outlet of the "third" flow path, the continuing flow path of the interior coolant is divided in two parallel paths, namely the "first" flow path and the "second" flow path that conform to at least one "first" heat exchanger tube 16 and to at least one "second" heat exchanger tube 18.

Along the first parallel path conforming to the respective heat exchanger tube 16, the mixture of liquid and gaseous phases of the interior coolant coming from the third flow path is further condensed without intermediate treatment to the saturated state as it is being cooled further by the external coolant in the form of the ambient air, whereby a minor amount of gas phase may always remain left over in the interior coolant. Said residual gas phase is then separated from the interior coolant in the collecting container 48.

In the second flow path conforming to the respective second heat exchanger tube 18, the mixture of liquid phase and gaseous phase of the third flow path conforming to the respective third heat exchanger tube 14 is directly withdrawn without intermediate treatment; however, said mixture is then exposed to the cooling influence of the external coolant in the form of the ambient air longer than along the first flow path, and it is consequently supercooled in this way. In said supercooled state, absorbed gas phase is resorbed without having to be separated separately, so that the interior coolant no longer contains any gas phase at the outlet of the second flow path. If, under special circumstances, inclusions of gas phase should nonetheless still be present in said second flow path, such inclusions are condensed again in the interior coolant at the latest under the vibrations of the operation of the motor vehicle without requiring any further measures.

The liquid phase of the interior coolant exiting from the first flow path, purified due to the separation of the gas, is then united in the lower zone of the collecting container 48 with the supercooled interior coolant exiting from the second flow path, and both coolants are jointly supplied to the outlet connection 12 in the liquid phase.

In terms of construction, the inlet chamber 20 in the distributing and collecting tube 6 parallel feeds a multitude of the "third" heat exchanger tubes 14, with flat aluminum tubes typically from six to eight of such tubes. The outlet ends of said "third" heat exchanger tubes 14 feed into a collecting and distributing chamber 22 in the distributing and collecting tube 8, from where the same or preferably a lower number of "third" heat exchanger tubes 14 is returned with reflux to a collecting and distributing chamber 24 in the distributing and collecting tube 6. In the downwardly directed sequence of the "third" heat exchanger tubes 14, further passage accordingly takes place between the chambers 20, 24, 24*b* and 28 in the distributing and collecting tube 6, said chambers being successively arranged from the top on downwards, and through the chambers 22, 24*a* and 26 in the distributing and collecting tube 8, in each case through the same number or again through a decreasing number of the "third" heat exchanger tubes 14, up to a last distributing and collecting chamber 28 in the distributing and collecting tube 6. In the case of flat aluminum tubes, the number of the heat exchanger tubes 14 acted upon in parallel is typically reduced in the last-mentioned return line to two to four tubes, whereby in the exemplified embodiment, provision is lastly made for still three heat exchanger tubes 14 whose number has been reduced in a cycle of 8, 6, 5, 4, 4, 3.

Said distributing and collecting chambers 22, 24, 24*a*, 24*b*, 26 and 28 each are completely separated from one another in terms of flow in the distributing and collecting tube 6 and, respectively, distributing and collecting tube 8, whereby a side wall of the distributing and collecting tube 6 or 8 in each case forms a tube bottom 52 for the heat exchanger tubes 14, 16 and 18.

The first flow path is limited to one single "first" heat exchanger tube 16 without limitation of the generality of the configuration. The interior coolant, which in most cases still contains a residual amount of gas phase (in accordance with the phase point B in the phase diagram of FIG. 9, said point being located exactly on the dashed saturation line), exits from said tube 16 and passes through the intermediate channel 31 extending vertically in the distributing and collecting tube 8, and then enters the upper gas phase of the gas separator 32, the latter being formed by the tubular collecting container 46.

The interior coolant in the aforementioned state "A" in the phase diagram coming from the last three "third" heat exchanger tubes 14 is supplied in this connection not only to the inlet of the first heat exchanger tube 16, but without further modification and particularly without interconnected separation of gas to the "second" heat exchanger tubes 18, which are present in a four fold number of tubes without limitation of the generality, and which are acted upon in parallel. Said heat exchanger tubes 18 all feed into a collecting chamber 34 in the distributing and collecting tube 8, which is provided downstream in the direction of flow with a throttling means 36 that is common to all three "second" heat exchanger tubes 18. In the present case, said throttling means is provided in the form of a throttling passage in the outer wall 38 of the distributing and collecting tube 8. Because of the throttling effect of said throttling means 36, the interior coolant passes through the second heat exchanger tubes 18 at a much lower rate of flow than through the first heat exchanger tube 16, which realizes in said second heat exchange path a supercooling realized in the collecting chamber 34 according to the phase point "C" of the phase diagram in FIG.9. The interior coolant is reduced to a lower pressure with the help of the throttling means with no change in the enthalpy. The collecting chamber 34 and the throttling passage 36 form a horizontally oriented transverse channel 33 through which the "second" heat exchanger tubes communicate with the lower zone of the collecting container 46.

Figure 7:
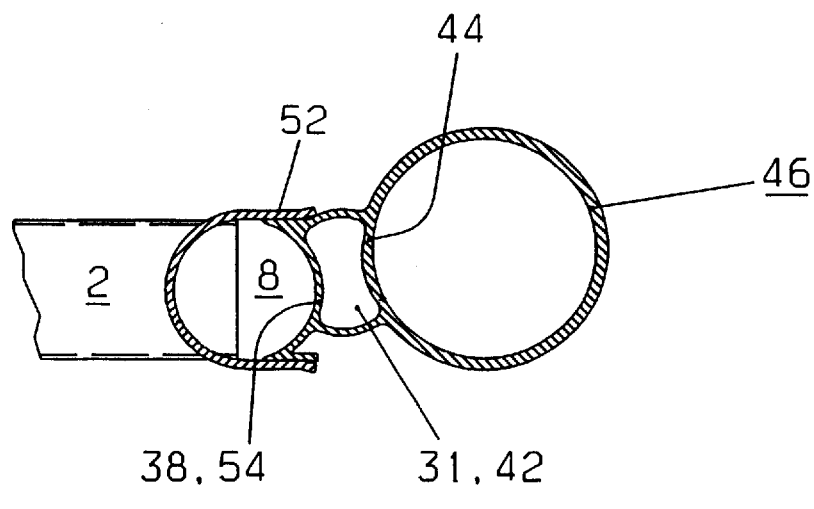
FIG. 7 is an enlarged representation of a horizontal part section through the distributing/collecting tube shown in FIG. 6 on the left-hand side, with an integrated collecting container based on FIG. 2.

It is shown with particular clarity by the horizontal cross section in FIG. 7 that provision is made for an additional chamber space for the purpose of creating the intermediate channel 31, which extends parallel with the distributing and collecting tube 8 on the outer wall of said tube facing away from the register of tubes, and which is provided in a structurally integrated form. In this connection, the tubular intermediate channel 31 extends in the form of a separate chamber 42 vertically along the distributing and collecting tube 8 above a collecting chamber 40, into which the first heat exchanger tube 16 is feeding, with separation from said collecting chamber 40. On the side located opposite the outer wall 38 of the distributing and collecting tube 8, said chamber 42 has its own outer wall 44, which is common to the tubular collecting container 46 having a larger horizontal cross section. The upper zone of said collecting container 46, which may, but need not, have a circular shape according to FIG. 7, communicates with the collecting chamber 40 of the first heat exchanger tube 16, via the vertical intermediate channel 31. At the bottom in the path of the horizontal transverse channel 33, the tubular chamber 42 communicates with the outlet of the throttling means 36, which, in terms of flow, is located downstream of the second flow path. The collecting container 46 itself also has the function of a gas separator, which was addressed herein earlier, so that a horizontal phase interface 48 is present in said container between the lower liquid phase and the upper gas phase. The vertical level of said interface varies depending on the operating conditions and the filling level of the interior coolant. The collecting chamber 34 located at the end of the "second" heat exchanger tube 18 in terms of flow, said collecting chamber being generally completely filled with supercooled interior coolant, communicates at the bottom via a throttling means 36 associated with the connection opening 50 located at the end of the transverse channel 33, with the lower zone of the gas separator 32, which zone is always filled with liquid phase, and where the interior coolants of the first and second paths are united with each other and are passed on from the outlet connection 12 in the direction of flow.

It is useful in term of construction if at least the tube bottom 52 of both the distributing and collecting tube 8 and the distributing and collecting tube 6, receiving the various heat exchanger tubes 2, is formed by solder-coated sheet metal supplemented by a collector cover 54 to form a collecting device. Especially in the case of the distributing and collecting tube 8, said collector cover 54 is a component of an extrusion-molded piece that forms as a single piece both the tubular chamber 42 and the tubular collecting container 46, and which itself is usefully made of aluminum or from an aluminum alloy. The connection with the collector bottom can be usefully realized by an inside coating of the sheet metal of the collector bottom with solder, said sheet metal being coated on both sides.

Within the region of the lower zone of the collecting container 46, normally taken up by the liquid phase, a drying cartridge 58 is inserted in a sealable inlet opening 56 located at the bottom of the collecting container 46. In a manner not shown it is possible, furthermore, to jointly install in the collecting container 46 also devices for controlling the filling level and for measuring the pressure and temperature, using, for example suitable sensors with display of the diagnoses.

According to FIG. 7, the tubular collecting container 46, the intermediate channel 31 and the distributing and collecting tube 8 are integrated components except for the tube bottom 52, whereby the circular cross section of the collecting container 46 has a larger dimensioning, in the present case specifically a greater diameter dimension in relation to the other parts specified above, in particular also in the diameter of the distributing and collecting tube 8, which is again circular. Novel is that the intermediate channel 31 has a symmetric cross section of the type of an oval that is indented in a curved way to the same extent both on the common wall of the collecting container 46 and the distributing and collecting tube 8, whereby the longitudinal axis extends transversely, and substantially vertically in the plane of the drawing in FIG. 2 in relation to the circular contours of the collecting container 46 and the distributing and collecting tube 8. This permits a simpler design of the respective end closing cap.

Figure 8:
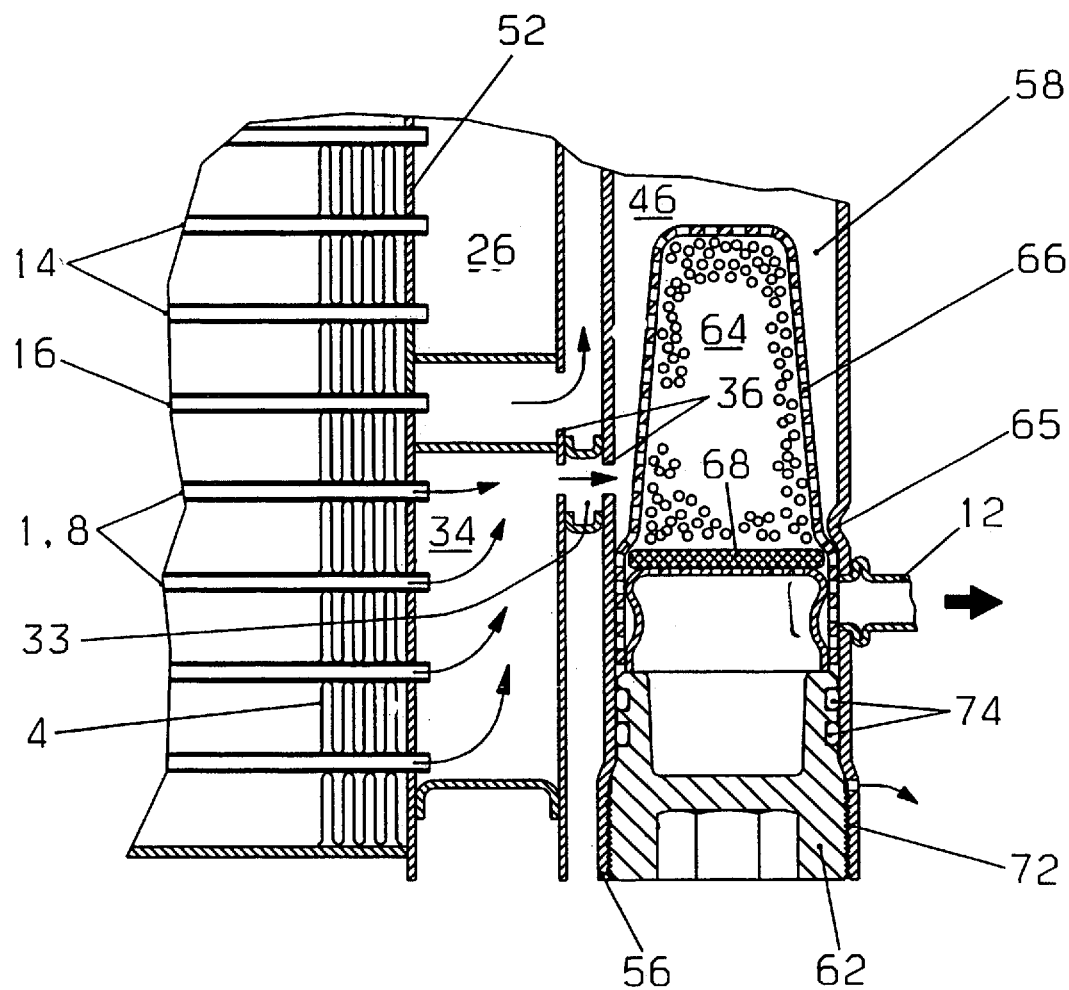
FIG. 8 shows an enlarged representation of a vertical part cross section through the lower zone of the collecting container, as well as of the condenser in the adjoining zone.

According to FIG. 8, the dryer insert 58 is clamped in between a lower closing part 62 of the collecting container 46 and a stop 65 formed within said collecting container 46. The dryer insert 58 comprises a number of components. The effective dryer filling 64 in the form of a drying agent (molecular sieve XH7 or XH9) is supplied in this connection in a filter bag and supported in a cage in the form of a cup-like sieve insert, said cage being permeable to flow. The supplied filter bag is first inserted in said sieve insert. A filter fleece 68 is subsequently placed on the bottom of the cup-like cage and a sieve-like cover insert 70, which is elastically yielding in the axial direction, is subsequently plugged against the filter fleece 68 from below. In this way, the dryer insert 58 is assembled to form a dryer cartridge that can be inserted in the tubular collecting container 46 from below until it abuts the stop 65.

The lower closing part 62 itself is a screw stopper which, in a lower widening of the tube forming the collecting container 46, engages via the thread 72 the inner surface of said expanded wall of the tube. In the narrower zone of the tube of the collecting container 46 adjoining the widened zone inwards, two O-ring seals are arranged axially one after the other to form a sealing device 74. In the shoulder region of the transition between the widened part of the tube and the part of the tube with the normal tube diameter, provision is made for a pressure relief opening 76 in the jacket of the tube of the collecting container 46. When the collecting container is closed, said opening 76 acts as an outlet opening at a level above the point of engagement of the thread 72 and below the sealing device 74. The length of the thread 72 is dimensioned in such a way that when the closing part 62 is screwed on, it is loosened in that the O-rings of the sealing device 74 first leave the seat of the O-rings on the inner surface of the wall of the tube, so that coolant can exit by way of the pressure relief opening 76 before the thread 72 is disengaged. This makes it possible, for example to replace the dryer insert 58 without causing any explosive relief of the coolant.

The stop 65 is formed usefully via three indentations distributed over the periphery of the jacket of the housing of the collecting container 46. The dryer insert 58 is clamped in this way between the lower closing part 62 and said indents in such a way that the drying agent is received abrasion-free in the cartridge owing to the elastic property of the sieve-like cover insert 70.

The mode of operation of such a condenser according to the fourth exemplified embodiment is described as follows:

The superheated coolant enters the upper zone of the distributing and collecting tube 6 by way of the inlet connection 10 and is then guided in the reversing chambers 20, 22, 24, 24a, 24b, 26 and 28 along a zigzag course in the condenser in the downward direction. In this process, it enters the chamber 28 in an almost saturated state according to phase point "A" in FIG. 9, in which chamber it is then divided to follow the first and second paths. In the first path of the (particular) heat exchanger tube 16, it can flow without any further restrictions of its flow through the intermediate channel 31 and into the upper zone of the collector 46, whereas on the outlet of the second heat exchanger tube 18, between the chamber 34 of the distributing and collecting tube 8 on the outlet side, and the lower zone of the collecting chamber 34 by way of the transverse channel 33, provision is made for the throttling means 36, the latter being dimensioned as defined in the characterizing part of claim 1.

Figure 9:
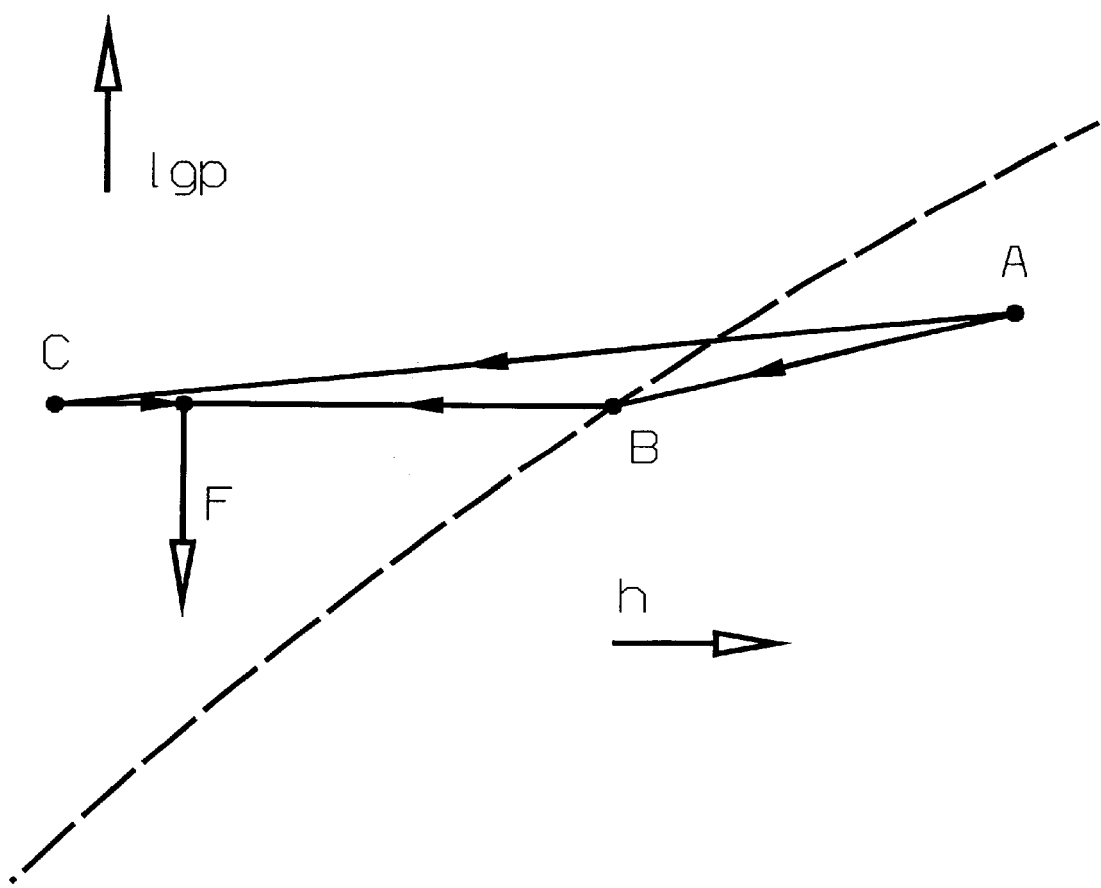

The rate of flow of the coolant flowing through the second heat exchanger tubes 18 is reduced by said throttling means 36 as compared to the rate of flow of the coolant passing through the (particular) first heat exchanger tube 16, so that along said second path through the second heat exchanger tubes 18, the coolant is converted from the state "A" in FIG. 9 into the supercooled state "C". In the collecting container 46, the saturated coolant (state "B" in FIG. 9) exiting from the respective first tube 16 and guided upwards through the intermediate channel 31 is then mixed with the supercooled coolant according to phase point "C" in FIG. 9 on the outlet of the transverse channel 3 connected with the second heat exchanger tubes 18.

Said mixing takes place according to the mass flow ratio of the coolant flowing through the first and second heat exchanger tubes, so that with the number of first and second heat exchanger tubes 16 and 18 shown in FIG. 6, the state of the mixture "F" according to FIG. 9 comes closer to the phase point "C" in the outlet region of the second heat exchanger tubes 18 downstream of the throttling means 36 because of the greater number of second heat exchanger tubes 18.

What is claimed is:

1. A process for condensing into a saturated state and subsequently supercooling the interior coolant of a motor vehicle air conditioning system, in which the ambient air of the motor vehicle serves as the external coolant, by dividing the path of flow of the interior coolant within the zone of influence of the external coolant in at least two parallel paths of flow which are subsequently united again, whereby the interior coolant is partially condensed in the direction of flow prior to the two parallel paths of flow within the zone of influence of the external coolant from the gas phase into the liquid phase, and whereby along the first parallel path of flow, the interior coolant is then farther condensed into the saturated state and residual gas phase of the interior coolant is separated, whereas along the second parallel path of flow, the interior coolant is supercooled and in the supercooled state united with the saturated interior coolant of the first parallel path, the latter having been freed of the gas phase, wherein following the partial condensation, the first and the second parallel paths of the interior coolant of flow are supplied with liquid to gaseous phase in the same or at least similar ratio, slightly modified by inertial demixing;

and that along the second parallel path, the rate of flow of the interior coolant is reduced in relation to the rate of flow of the coolant along the first parallel path by a greater loss of pressure, and said loss of pressure on the second parallel path is dimensioned in this connection in such a way that the difference of the static pressure at the outlet of the first path of flow minus the static pressure at the outlet of the second path of flow is greater than or equal to the pressure of the liquid column of the interior coolant between the gas/liquid interface of the interior coolant in the direction of flow downstream of the first parallel path and a level above the outlet of the second parallel path.

2. The process according to claim 1, wherein in the second parallel path, the higher loss of pressure is adjusted by throttling the rate of flow at the end of the second parallel path and/or in the course of the second parallel path.

3. The process according to claim 1, wherein in the second parallel path, the higher loss of pressure is adjusted by lowering the inlet pressure in the second parallel path in relation to the inlet pressure in the first parallel path.

4. The process according to claim 3, wherein the relatively different inlet pressures in the first and second parallel paths are produced by utilizing the Bernoulli effect.

5. The process according to claim 1, wherein the partial condensation is carried out below the two parallel paths, and that the difference in height between a lower level of the zone of partial condensation of the interior coolant, with a plurality of inlet openings of the lowest inlet opening, into the path of partial condensation, and up to barely below the level of the first parallel path, is exploited in this connection for compensating the variations of the gas/liquid interface in the direction of flow downstream of the first parallel path depending on different and/or changing filling amounts of the interior coolant and/or changing operating conditions of the motor vehicle.

6. A condenser of interior coolant of an automotive air conditioning system with a network of horizontally oriented heat exchanger tubes arranged parallel one on top of the other, said tubes being acted upon by the ambient air of the motor vehicle serving as the external coolant and being interconnected with each other in terms of flow via vertically oriented distributing/collecting tubes arranged on both sides for conducting an interior coolant, whereby the interconnection at different vertical levels has at least one third heat exchanger tube, in particular a multitude of third heat exchanger tubes receiving the flow of the coolant first and being usable for a partial condensation, on the one hand, and a parallel interconnection of at least one first and at least one second heat exchanger tube subsequently receiving the flow of coolant, on the other hand, in connection with which the first heat exchanger tube or tubes arranged at a higher level in relation to the respective second heat exchanger tube or tubes can be used for further condensation into a partially saturated state, and the respective second heat exchanger tube or tubes can be used for supercooling; and whereby a device for the separation of residual gas phase is arranged in the direction of flow downstream of the first heat exchanger tube being in each case the last one in terms of flow;

wherein a distributing/collecting tube distributes the partially condensed coolant exiting in each case from the last third heat exchanger tube in terms of flow to the first and the second heat exchanger tubes, substantially maintaining the gas/liquid ratio;

the device for separating residual gas phase of the coolant exiting from in each case the last first heat exchanger tube in terms of flow being structurally combined with a distributing/collecting tube; and wherein provision is made for a means for producing a lower rate of flow of the coolant in the respective second heat exchanger tube in relation to the respective first heat exchanger tube.

7. The condenser according to claim 6, wherein the means for producing a lower rate of flow is a throttling member at the mouth of the respective second heat exchanger tube in a distributing/collecting tube and/or a throttling member in an outlet opening of a collecting chamber in a distributing and collecting tube within the zone of the mouth of the respective second heat exchanger tube.

8. The condenser according to claim 6, wherein the member for producing a lower rate of flow is a throttling means arranged upstream of the respective second heat exchanger tube in terms of flow, or on an inlet opening of an ante-chamber in a distributing and collecting tube located upstream.

9. The condenser according to claim 6, wherein the means for producing a lower rate of flow is produced by designing the respective second heat exchanger tube in a different way as compared to the respective first heat exchanger tube with respect to the inside tube diameter, the length of the flow path, the shape of the tube, built-ins and/or the characteristic of the inner surface.

10. The condenser according to claim 6, wherein
the third heat exchanger tubes are arranged at a level below the second heat exchanger tubes;
wherein a channel for the supercooled coolant is formed in the distributing and collecting tube to which the respective second heat exchanger tube is connected, said channel extending from the top downwards and continuing in terms of flow; and
wherein a collecting container is formed, being structurally united with the same distributing and collecting tube and connected with the respective first heat exchanger tube provided as a gas separator, the latter extending across the height of the condenser and communicating at its bottom end with the channel for passing on the supercooled coolant, at the level at which the coolant exits.

11. The condenser according to claim 10, wherein the collecting container and the distributing and collecting tube structurally united with the latter are formed by separate structural components constructing between each other the continuing channel.

12. The condenser according to claim 11, wherein the separate structural parts consist of aluminum or an aluminum alloy wherein the distributing/collecting tube is formed by sheet metal coated with hard solder; and wherein the collecting container including the continuing channel is an integrated extruded section.

13. The condenser according to claim 10, wherein the collecting container is provided with a dryer insert.

14. The condenser according to claim 6, wherein the third heat exchanger tubes are arranged at a level above the first heat exchanger tubes, and wherein three chamber arranged one on top of the other in the interior space of the same distributing/collecting tube each divided by a partition, of which the uppermost chamber communicates with the third heat exchanger tube(s) and is separated in terms of flow from the center chamber by the upper partition, the center chamber communicates with the respective first heat exchanger tube, and the lower chamber serving at the same time as the outlet chamber from the condenser communicates with the second heat exchanger tube, whereby the lower partition is provided with at least one passage opening for liquid coolant flowing from the respective first tube from the center chamber into the lower chamber, said passage opening forming the means for separating residual gas phase of the coolant coming from the respective heat exchanger tube.

15. The condenser according to claim 14, wherein at least one partition is vertically flared outwards, widening the center chamber.

16. A condenser of the interior coolant of an automotive air conditioning system, with a network consisting of horizontally oriented heat exchanger tubes arranged parallel one on top of the other, said tubes being acted upon by the ambient air of the motor vehicle serving as the external coolant, and being interconnected with each other in terms of flow via vertically oriented distributing/collecting tubes on both sides for conducting an interior coolant, whereby the interconnected network has at different levels at least one third heat exchanger tube receiving the flow of coolant first and being usable for partial condensation, in particular a multitude of third heat exchanger tubes, on the one hand, and on the other hand a parallel interconnected arrangement of at least one first and at least one second heat exchanger tube subsequently receiving the flow of coolant, in connection with which the respective first heat exchanger tube, the latter being arranged at a higher level particularly with respect to the second heat exchanger tube or tubes, is usable for further condensing the coolant into a partially saturated state, and the respective second heat exchanger tube is usable for supercooling; and whereby a means for separating residual gas phase is arranged in the direction of flow downstream of the last heat exchanger tube;

wherein a distributing/collecting tube substantially distributes the partially condensed coolant coming in each case from the last third heat exchanger tube in terms of flow to the first and the second heat exchanger tubes, maintaining the gas/liquid ratio;

wherein the device for separating residual gas phase of the coolant exiting in each case from the last first heat exchanger tube in terms of flow is a collecting container extending along the level of the condenser and communicating in each case in the zones of its upper and lower ends with the respective first and second heat exchanger tubes, whereby the one communicating connection is realized in the form of a vertically extending intermediate channel and the other communicating connection in the form of a horizontally oriented transverse channel of a structural combination comprising the collecting container and the distributing/collecting tube, and whereby the outlet for the coolant from the condenser is arranged within the zone of the bottom end of the collecting container; and wherein provision is made for a means for producing a lower rate of flow of the coolant in the respective second heat exchanger tube with respect to the pertinent first heat exchanger tube;

the third heat exchanger tubes are arranged at a level above the first and second heat exchanger tubes;

the first heat exchanger tube in each case feeds its partly condensed phase of the coolant into the zone of the upper end of the collecting container; and the second heat exchanger tube in each case feeds its supercooled coolant into the zone of the lower end of the collecting container.

17. The condenser according to claim 16, wherein the device for producing a lower rate of flow has a throttling means located at the mouth of the respective second heat exchanger tube in a distributing/collecting tube, and/or a throttling means located in the outlet opening of a collecting chamber in a distributing/collecting tube in an outlet opening of a distributing/collecting tube within the region of the mouth of the respective second heat exchanger tube.

18. The condenser according to claim 16, wherein the device for producing a lower rate of flow is a throttle located upstream of the respective second heat exchanger tube in terms of flow.

19. The condenser according to claim 16, wherein the means for producing a lower rate of flow is realized by differently designing the respective second heat exchanger tube in each case as compared to the respective first heat exchanger tube with respect to the inside tube diameter, the length of the path of flow, the shape of the tube, the built-ins and/or the characteristic of the inner surface.

20. The condenser according to claim 16, wherein the collecting container and the distributing/collecting tube structurally united with it are formed by separate structural components forming the continuing channel between each other.

21. The condenser according to claim 20, wherein the separate structural components consist of aluminum or an aluminum alloy; that the distributing/collecting tube being shaped from a sheet metal coated with hard solder; and the collecting container with the continuing channel being an integral extrusion-molded section.

22. The condenser according to claim 16, wherein the collecting container is provided with a dryer insert.

23. The condenser according to claim 22, wherein the dryer insert is clamped in between a lower closing part of the collecting container and a stop formed within the collecting container.

24. The condenser according to claim 23, wherein the stop is formed by three indentations distributed over the periphery of the jacket of the housing of the collecting container.

25. The condenser according to claim 24, wherein a fitter fleece is mounted on the bottom of the cage.

26. The condenser according to claim 25, wherein the pressure relief opening is a drain opening through which the coolant can exit from the collecting container before the thread is disengaged.

27. The condenser according to claim 23, wherein the dryer insert is formed by several components, whereby the effective dryer filling is supported in a cage permeable to flow, in connection with which cage a preferably axially elastic cage bottom facing the closing part, and a cage cup located on the side of the cage facing away from the closing part and complementing the cage are clamped together.

28. The condenser according to claim 23, wherein the closing part is a screw stopper cooperating above the thread engaging with the inner wall of the collecting container; and wherein the wall of the collecting container is provided with a pressure relief opening, the latter being arranged, with the collecting container closed, at a level above the thread engagement and below the sealing device in such a way that when the closing part is unscrewed from the collecting container, the pressure relief opening communicates with the interior space of the collecting container before the engagement of the thread becomes ineffective.

* * * * *